United States Patent
Karageorgos et al.

(10) Patent No.: US 12,236,246 B2
(45) Date of Patent: Feb. 25, 2025

(54) MODULAR, EXTENSIBLE COMPUTER PROCESSING ARCHITECTURE

(71) Applicant: Yale University, New Haven, CT (US)

(72) Inventors: Ioannis Karageorgos, New Haven, CT (US); Karthik Sriram, New Haven, CT (US); Jan Vesely, Hamden, CT (US); Rajit Manohar, New Haven, CT (US); Abhishek Bhattacharjee, New Haven, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 17/115,195

(22) Filed: Dec. 8, 2020

(65) Prior Publication Data

US 2021/0182073 A1     Jun. 17, 2021

Related U.S. Application Data

(60) Provisional application No. 62/947,795, filed on Dec. 13, 2019.

(51) Int. Cl.
    *G06F 9/38*           (2018.01)
    *G06F 1/10*           (2006.01)
    (Continued)

(52) U.S. Cl.
    CPC ............ *G06F 9/3871* (2013.01); *G06F 1/10* (2013.01); *G06F 3/015* (2013.01); *G06F 9/4881* (2013.01);
    (Continued)

(58) Field of Classification Search
    CPC ........ G06F 3/015; G06F 13/4022; G06F 1/10; G06F 9/3871; G06F 9/4881; G06F 1/324; G06F 17/142
    (Continued)

(56) References Cited

U.S. PATENT DOCUMENTS

| | | | | |
|---|---|---|---|---|
| 6,145,072 A | * | 11/2000 | Shams | G06F 15/17343 710/2 |
| 2007/0130447 A1 | * | 6/2007 | Coon | G06F 9/3851 712/215 |

(Continued)

OTHER PUBLICATIONS

Ibrahim et al., "Electromagnetic Power Absorption and Temperature Changes due to Brain Machine Interface Operation," 2007, Annals of Biomedical Engineering, vol. 35, pp. 825-834 (Year: 2007).*

*Primary Examiner* — Chun Kuan Lee
(74) *Attorney, Agent, or Firm* — Saul Ewing, LLP; Sean Ritchie; Kathryn Doyle

(57) ABSTRACT

One aspect of the invention provides a computer processing architecture including: a plurality of processors, each processor configured to: receive a set of data from one or more input channels or from another processor; execute at least one of a plurality of individualized processes on the data; and output the processed data according to an independent clock domain of the processor; a plurality of switches, wherein each switch connects a processor to an input channel of the one or more input channels or to another processor; and a micro-controller configured to: receive the processed data; control the plurality of switches by activating or deactivating each switch; generate a pipeline of processors from activating and deactivating the plurality of switches; and select one or more individualized processes of the plurality of individualized processes that each processor within the pipeline executes.

15 Claims, 9 Drawing Sheets

(51) Int. Cl.
  *G06F 3/01* (2006.01)
  *G06F 9/48* (2006.01)
  *G06F 13/40* (2006.01)
  *G06F 17/14* (2006.01)

(52) U.S. Cl.
  CPC ........ *G06F 13/4022* (2013.01); *G06F 17/142* (2013.01)

(58) Field of Classification Search
  USPC ........................................................ 712/220
  See application file for complete search history.

(56) References Cited

U.S. PATENT DOCUMENTS

| | | | |
|---|---|---|---|
| 2018/0217844 A1* | 8/2018 | Kalamatianos | G06F 9/3001 |
| 2019/0231204 A1* | 8/2019 | Heydari | A61B 5/6868 |
| 2020/0023189 A1* | 1/2020 | Gribetz | A61N 1/36196 |
| 2020/0133360 A1* | 4/2020 | Sadowski | G06N 3/063 |
| 2020/0242452 A1* | 7/2020 | Tschirhart | G06N 3/063 |

* cited by examiner

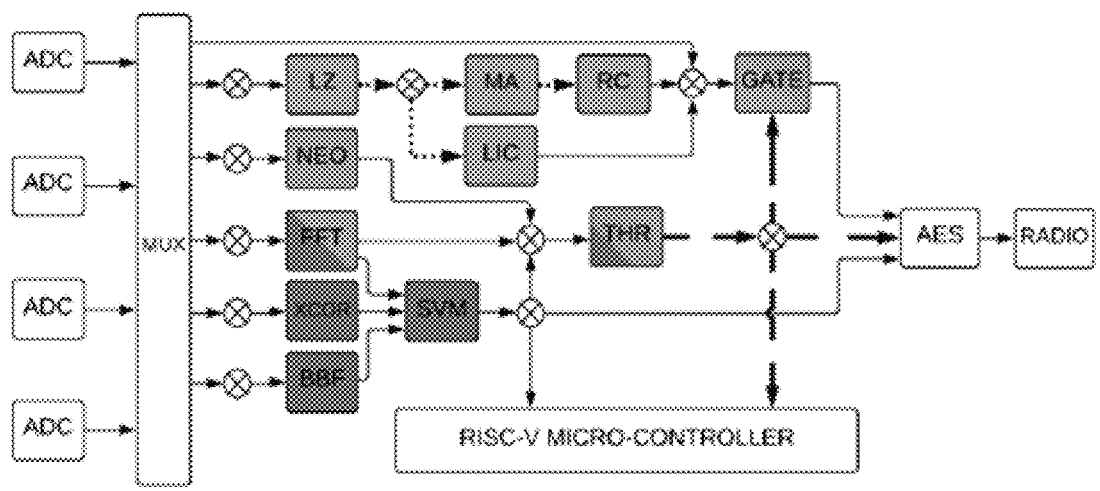

| | |
|---|---|
| ⊗ Routing Switch | Compression |
| → Byte stream | Movement Intent |
| ⋯▶ Token Stream | Seizure Prediction |
| — → Bit stream | Spike Detection |

Frequently used pipelines

Compression (LZ4): ADC → MUX → LZ → LIC → [AES] → RADIO

Compression (LZMA): ADC → MUX → LZ → MA → RC → [AES] → RADIO

Movement Intent: ADC → MUX → FFT → THR → [GATE] → [AES] → RADIO

Seizure Prediction: ADC → MUX → {FFT, XCOR, BBF} → SVM → THR → [GATE] → [AES] → RADIO Encryption: ADC → MUX → GATE → AES → RADIO Spike Detection: ADC → MUX → NEO → THR → GATE → [AES] → RADIO

FIG. 2

| PE | Freq (MHz) | Logic (mW) Leak | Logic (mW) Dyn | Mem (mW) Leak | Mem (mW) Dyn | Total | Area (KGE) |
|---|---|---|---|---|---|---|---|
| LZ-HLS | 129 | 0.055 | 1.455 | 0.095 | 1.466 | 3.071 | 55 |
| LIC-HLS | 22.5 | 0.057 | 0.267 | 0.006 | 0.046 | 0.376 | 25 |
| MA-HLS | 92 | 0.127 | 2.148 | 0.067 | 0.997 | 3.339 | 66 |
| RC-HLS | 90 | 0.029 | 0.763 | 0 | 0 | 0.792 | 12 |
| NEO-HLS | 3 | 0.012 | 0.003 | 0 | 0 | 0.015 | 5 |
| FFT-Custom | 15.7 | 0.057 | 0.509 | 0.085 | 0.356 | 1.007 | 22 |
| XCOR-HLS | 205 | 0.07 | 7.686 | 0.307 | 0.053 | 8.116 | 41 |
| BBF-HLS | 6 | 0.066 | 0.034 | 0 | 0 | 0.1 | 23 |
| SVM-HLS | 3 | 0.018 | 0.018 | 0.081 | 0.033 | 0.15 | 8 |
| THR-HLS | 16 | 0.002 | 0.011 | 0 | 0 | 0.013 | 1 |
| GATE-HLS | 5 | 0.003 | 0.006 | 0.067 | 0.054 | 0.13 | 17 |
| AES-Custom | 5 | 0.053 | 0.059 | 0 | 0 | 0.112 | 34 |
| Capabilities | | | | | | | |
| Compr (LZ4) | | 0.112 | 1.722 | 0.101 | 1.512 | 3.447 | 80 |
| Compr (LZMA) | | 0.211 | 4.366 | 0.122 | 2.463 | 7.162 | 133 |
| Seizure Pred | | 0.216 | 8.264 | 0.54 | 0.496 | 9.516 | 111 |
| Spike Det | | 0.017 | 0.02 | 0.067 | 0.054 | 0.158 | 24 |
| Move Intent | | 0.062 | 0.526 | 0.152 | 0.41 | 1.15 | 40 |
| Encrypt (Raw) | | 0.053 | 0.059 | 0 | 0 | 0.112 | 34 |
| RISC-V Control$_{est}$ | 30 | 0.341 | 0.161 | 0.248 | 1.290 | 2.040 | 70 |

FIG. 5

MODULAR, EXTENSIBLE COMPUTER PROCESSING ARCHITECTURE

CROSS-REFERENCE TO RELATED APPLICATION(S)

This application claims the benefit of priority under 35 U.S.C. § 119(e) to U.S. Provisional Patent Application Ser. No. 62/947,795, filed Dec. 13, 2019. The entire content of this application is hereby incorporated by reference herein.

STATEMENT REGARDING FEDERALLY SPONSORED RESEARCH OR DEVELOPMENT

This invention was made with government support under 1815718 awarded by National Science Foundation. The government has certain rights in the invention.

BACKGROUND OF THE INVENTION

Various microelectronic systems require demanding capabilities from their processors. For example, implantable brain-computer interfaces (BCIs) have to balance many requirements. They must be low-power so that they are safe to deploy surgically and implant chronically. They must be adequately performant to provide real-time performance necessary for many uses (e.g., treatment of diseases). They must be modular so that the design can be seamlessly scaled to extract ever-increasing amounts of brain signals. They must be extensible because the brain-computer interface field is nascent; an ideal BCI platform would be able to integrate new computational kernels easily without requirement adjustment to the basic architecture. And finally, they must be general-purpose so that they can be used to treat many diseases, improve human-computer interaction in many ways, and be deployable in many different brain regions, at many different depths.

SUMMARY OF THE INVENTION

One aspect of the invention provides a computer processing architecture including: a plurality of processors, each processor configured to: receive a set of data from one or more input channels or from another processor; execute at least one of a plurality of individualized processes on the data; and output the processed data according to an independent clock domain of the processor; a plurality of switches, wherein each switch connects a processor to an input channel of the one or more input channels or to another processor; and a micro-controller configured to: receive the processed data; control the plurality of switches by activating or deactivating each switch; generate a pipeline of processors from activating and deactivating the plurality of switches; and select one or more individualized processes of the plurality of individualized processes that each processor within the pipeline executes.

This aspect of the invention can have a variety of embodiments. The computer processing architecture can further include one or more sensors coupled to the one or more input channels and configured to collect neural signals, wherein the plurality of processors are each further configured to receive the set of data from at least one of the one or more sensors or from another processor.

The computer processing architecture can be implemented within a brain-computer interface (BCI).

The computer processing architecture can further include a radio transceiver configured to transmit communications corresponding to the processed data.

The micro-controller can be further configured to adjust a set of parameters corresponding to the execution of the at least one individualized process for at least one processor.

Each processor can include a dedicated local memory, wherein the dedicated local memory stores a set of instructions for executing the plurality of individualized processes, a set of parameter values corresponding to the individualized processes, and the processed data.

The computer processing architecture can further include a plurality of neural stimulators, wherein the micro-controller is further configured to activate at least one of the plurality of neural stimulators according to the processed data. The micro-controller can be further configured to activate 16 neural stimulators simultaneously, wherein the activation expends 0.5 mW of power.

The plurality of processors can be selected from the group consisting of a compression processor, a Fast Fourier Transform processor, a cross-correlation processor, a bandpass filter processor, a support vector machine processor, a threshold processor, a non-linear energy operator processor, a linear integer coding processor element, a gateway processor, an encryption processor, a pair-search processor, a counter value processor, and a range encoding processor.

The micro-processor can be further configured to select a pipeline design according to the processed data, wherein the pipeline design is selected from the group consisting of a seizure prediction pipeline, a movement intent pipeline, a compression pipeline, a neural activity spike detection pipeline, and an encryption pipeline, wherein the generated pipeline is generated according to the selected pipeline design.

The plurality of processors can operate on an asynchronous architecture. The one more individualized processes within the pipeline can be executed by one or more computation loops.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIG. 2 depicts a block diagram of a computer processing architecture according to an embodiment of the claimed invention. AC-to-DC converters (ADCs) digitize the analog neuronal signals and feed them into processing logic, which consists of low-power hardware processing elements (PEs) for frequently-used signal processing (and other) operations. A RISC-V micro-controller supports any other computation, and also configures the switches to route data through the processors (e.g., Pes). Each configured pipeline of PEs realizes a capability, ranging from compression to spike detection. On the right, we summarize the relationship between PEs and capabilities. PEs that are optional in a capability (e.g., AES encryption) are shown in square brackets. PEs that can be fed data in parallel (e.g., FFT, XCOR, and BBF in the seizure prediction pipeline) are shown in curly brackets. In one embodiment, some capabilities can be restricted to less than 15 mW of total power.

FIG. 5 depicts a table of power, frequency, and area for processors, according to an embodiment of the claimed invention. PE suffixes indicate whether we use HLS-generated or hand-crafted Verilog (e.g., LZ-HLS stands for LZ generated using HLS, while FFT-Custom indicates that we use custom-designed Verilog). We separate leakage and dynamic power for logic versus memory. Area is shown in kilo-gate equivalents (KGEs). All numbers assume real-time processing rates of 46 Mbps.

DEFINITIONS

Figure 1:
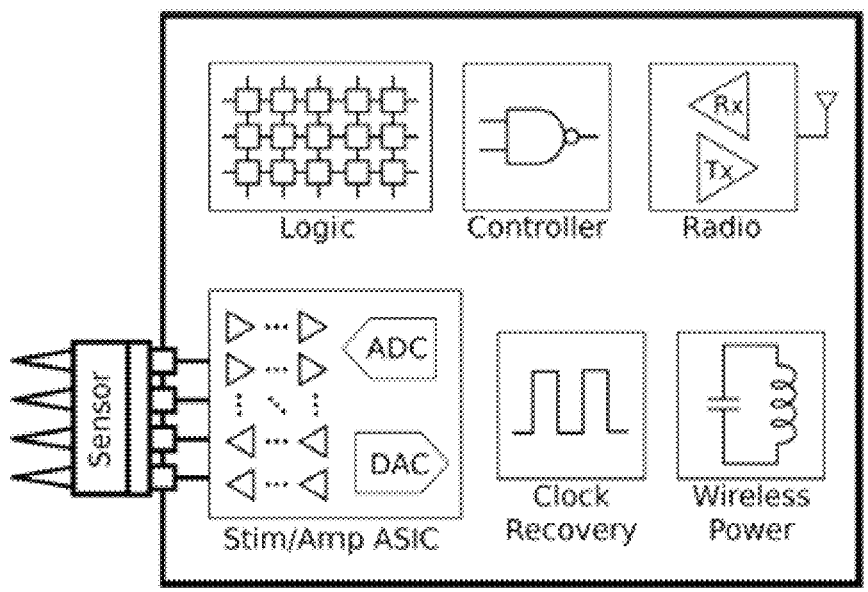
FIG. 1 depicts a brain-computer interface (BCI), according to an embodiment of the claimed invention. Implantable BCIs have form factors under 1 $cm^2$ and are placed on brain tissue, where their sensors probe a few millimeters into the tissue. The devices can be packaged in a hermetically-fused silica capsule or titanium capsule. The first is generally preferred because it permits easier optical and RF signal transmission.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Embodiments of the invention provide a modular, extensible processing architecture for a plurality of processors.

Processor Architecture

The processor architecture described herein allows for a configurable array (e.g. pipeline) of processors (e.g., processing elements (PEs)), where each configured processor can be grouped and activated to perform specific tasks, dependent upon the processing capabilities of each processor within the group. The configurability of the processor pipelines can reduce processor resources usage and increase efficiency of software execution by streamlining heterogeneous processes particular to the individual processors. The processors can also communicate asynchronously, further reducing resource usage within the architecture.

Processors

The processing architecture can include a variety of processors. These processors can each include a set of processing capabilities unique to the processor. In some cases, a processor can include at least one nested computation loop. For example, a processor can include a mean computation processing loop, a sum of squares processing loop, a square root processing loop, and the like. These nested loops can decrease power usage within the processing architecture. Other examples of processing capabilities or functionalities are illustrated in Table 1 below. Embodiments of the invention permit end-users to parameterize some key attributes of the design (e.g., the history length of LZ can be made between 256 and 4096 bytes).

TABLE 1

Processors, Including Functional Operation, Key Data Structure, and Interactions With One Another

| PE | Functionality | Parameters |
|---|---|---|
| LZ | Lempel-Ziv match length-offset pair search. Hashes four input bytes to index into first array of hash-chain, which records position of previous instance of the same data. Indexes second array of hash-chain using this value and find distance to previous occurrence of data. | History length, H [256-4096B]<br>First array size is 8KB<br>Second array size is 2 × H bytes<br>Max memory size is 16KB |
| LIC | Encodes LZ output using linear integer coding. A 256-byte array is used to store literals (bytes with no previous matches). All literals are output on matches and identified with headers and lengths. | N/A |
| MA | Receives literals, lengths, and offsets from LZ. Maintains three counters per input (for literal, length, offset) in a Fenwick tree. Counter lookups and updates are O(logN). Emits counter values to RC, for each input | History length, H [256-4096B]<br>Literal counter is always 256 bytes<br>Length/offset counters are 2 × H bytes<br>Max memory size is 16.25 KB |
| RC | Encodes Lempel-Ziv using range encoding with the counters from MA | N/A |
| NEO | Non-linear energy operator, which estimates the energy content of a signal using techniques described in S. Gibson et al., "Spike Sorting: The First Step in Decoding the Brain: The First Step in Decoding the Brain," 29 (1) IEEE Sig. Proc. M. 124-43 (Jan. 2012) | N/A |
| FFT | Fast Fourier Transform of channels. | FFT points [up to 1024] |
| XCOR | Accepts list of channel numbers (i.e., channel map) for which pair-wise cross-correlation is calculated. Uses input parameter LAG to control the delay between the two channels. | LAG [0-64]<br>User-defined channel map |
| BBF | Butterworth bandpass filtering to identify frequency bands in neural activity correlated to seizures | Frequencies up to ADC Nyquist limit |
| SVM | Uses outputs of FFT, BBF, and XCOR to predict seizure onset. Multiplies input values and weights to perform classification | Up to 5000 32-bit user-defined integer weights |
| THR | Emits a set bit if input is below threshold | User-defined threshold value (32-bit) |
| GATE | Decides whether to pass one input stream based on the value of the second input line (provided by THR). | N/A |
| AES | AES-128 bit encryption in ECB mode | Encryption key [128-bit] |

Switches

The processing architecture can include a plurality of switches. These switches can communicatively couple processors to each other, as well as to other input/output devices the processing architecture is connected to (e.g., a transceiver to wireless communication, sensors for receiving data, etc.). In some cases, each switch can couple two entities of the architecture together (e.g., two processors, a processor and a data input channel, a processor and a data output channel, etc.). Further, these switches can each include an open position and a closed position. For a closed position, the switch can allow communications to pass between the coupled entities. For an open position, communication between the coupled entities can be disabled. Each switch can be controlled apart from each other, thereby allowing for a multitude of communication chains between the processors.

Micro-Controller

The processors and switches can be communicatively coupled to a micro-controller. In some cases, the micro-controller can be a RISC-V micro-controller. The micro-controller can control the open and closed positions of each switch, and can also control the processes executed by the processors. The combination of controlled switches and process executions can form a configured processing pipeline of the processing architecture.

Asynchronous Communication

The processors can asynchronously communicate with one another. For example, each processor can operate in individual clock domains. A processor can transmit data to another coupled processor when the data is prepared for transmission. However, the transmitting processor can receive an acknowledgement (ACK) from the recipient processor based on the recipient processor's clock domain. This asynchronous communication scheme can improve power efficiency, as each processor can be clocked at a minimal frequency required to process data.

Configurability

The processing architecture can be configurable based on the desired uses of the architecture. For example, the processor types used in the architecture can vary both in what type of processors are used (e.g., what functions each processors can perform) as well as in how the processors are coupled to one another. An example of a processing architecture is shown in FIG. 2. As seen, numerous types of processors can be included within the architecture. However, in the example of FIG. 2, additional processors can be added, and processors can be replaced or removed based on desired capabilities for the architecture.

Further, the pipelines are generated by the micro-controller can also be configurable. In FIG. 2, a list of possible pipelines are shown below the architecture diagram. However, these listed pipelines can be a subset of pipelines that can be generated by the architecture. Moreover, the order in which processes are run can also be configurable. For example, the order of processes conducted in series can be arranged by the micro-controller, and processes can be run in parallel with one another (e.g., which may reduce processing resources).

EXPERIMENTAL EXAMPLE

Brain-computer interfaces (BCIs) offer avenues to treat neurological disorders, shed light on brain function, and interface the brain with the digital world. Several technical hurdles, however, preclude their wider adoption. These include the need for adequate (often real-time) performance, stringent power/energy constraints, and safety requirements (e.g., the FDA limits the heat and radio energy they are permitted to emit). Consequently, brain-computer interfaces have, to date, been customized to treat only certain diseases or perform specific tasks in specific brain regions. General-purpose architectures that can be used for multiple tasks and to treat multiple diseases are needed for wider BCI adoption.

We present HALO (a Hardware Architecture for LOw-power BCIs), a general-purpose architecture for implantable BCIs. We study commercial and research BCIs and identify important compute capabilities that they should offer. These capabilities enable treatment of disorders (e.g., epilepsy, movement disorders), and record/process data for studies that advance our understanding of the brain. We collect electrophysiological data from the motor cortex of a non-human primate to determine how to decompose these capabilities into hardware building blocks. We simplify, prune, and share these building blocks to judiciously use available hardware resources. The result is a configurable and heterogeneous array of processing elements (PEs) managed by a RISC-V micro-controller that can configure PEs into distinct signal processing pipelines that meet the target performance and power constraints necessary to deploy HALO widely and safely.

INTRODUCTION

Brain-computer interfaces (BCIs) hold promise in treating debilitating neurological diseases, shedding light on our understanding of the brain, and enabling new classes of brain-computer interaction. Researchers have demonstrated neural interfaces that enable brain-controlled movement of prostheses, treatment of neurological conditions such as Parkinson's disease, epilepsy, and schizophrenia, as well as navigation of augmented realities. BCI development is even moving beyond academic labs to industry, with companies like Kernel, Mindmaze, Longeviti, Neuropace, Neurable, Medtronic, and Neuralink building new generations of BCIs.

Many BCIs are realized as headsets or electrodes placed on the scalp. These use the electromagnetic signals emanating over the skull from biological neurons to deduce neuronal firing patterns. While these devices do not require surgical deployment, the signals they collect are noisy and low-resolution, making them less ideal as a source of control signal than other forward-looking BCI applications. In these cases, a better alternative—and the focus of our study—is to surgically embed BCIs directly on, around, and in the brain tissue. Such proximity enables them to record from (and stimulate, as desired) an ever-increasing number of neurons with high signal fidelity, spatial resolution, and in real time. Closed-loop implantable devices enable robust brain-computer interactions, but require carefully designed on-board processing hardware.

The classic debate between the usability of general-purpose processing and the efficiency of specialization is central to developing and deploying useful BCI hardware. For wide dissemination, general-purpose functionality at low-power is desirable. Achieving both has traditionally been difficult; designers have generally built specialized BCIs for particular uses in particular brain regions. In response to these challenges, we build HALO (a Hardware Architecture for LOw-power BCIs), a general-purpose architecture for implantable BCIs. HALO advances research on balancing domain-specific and general-purpose capabilities for an important class of low-power devices that are exemplars of emerging cutting-edge IoT technologies.

To realize HALO, we identify processing capabilities that are candidates for specialization by studying commercial and research-grade BCIs. Determining how best to realize these capabilities in hardware requires evaluations with neuronal signals extracted in vivo. We therefore collect and analyze electrophysiological data from a non-human primate's arm and leg motor cortex (e.g., the brain regions responsible for execution of arm and leg movement). We use this analysis to inform HALO's hardware and ascertain that it balances power, compute, and safety requirements for implantable BCIs. In particular, HALO achieves the following attributes:

General-purpose functionality: For BCIs to be widely used, they must be general-purpose. Consider, for example, the developing brain interfaces for major neuropsychiatric disorders, which require implants in brain regions ranging from the dorsal and orbital prefrontal cortices to the amygdala, hypothalamus, and ventral striatum (among others). These regions use different neural circuits, and thus may require different BCI processing capabilities. Even more challenging, patients with one neurological disorder often suffer from others too. For example, patients diagnosed with epilepsy are eight times more likely to develop Alzheimer's and three times more to develop Parkinson's diseases. This heterogeneity of neurological diseases, and the desire to personalize treatment of them, highlights the need for a BCI platform that can achieve multiple end capabilities. Nevertheless, power and safety constraints (which we discuss below) have historically biased designers towards specialized architectures, leading to a fragmented ecosystem of domain- and disease-specific implantable BCIs. HALO realizes a more general-purpose architecture.

Performance: Many BCI applications require closed-loop operation where neuronal signals must be processed in real-time so that on-board neurostimulators can electrically stimulate brain tissue. In treating epilepsy, for example, implantable BCIs must stimulate brain regions within tens of milliseconds of seizure onset detection to mitigate the likelihood of a seizure. Building on-board computation that can achieve this with low-power is challenging. This is compounded by advances in neural sensors, which can already record the activity of several thousands of neurons at once, and are expected in the future to record information from millions of neurons simultaneously via initiatives like DARPA NESD or Neuralink-style "thread" technologies.

Safety: The FDA, FCC, and IEEE define guidelines for safe use of implantable BCIs. For example, implantable devices must not heat up surrounding brain tissue by more than 1° C., as cellular damage occurs beyond this range. Similarly, implant radios must not deposit excessive RF power into the brain tissue, so as to preclude overheating and potential cellular damage. One might consider circumventing this problem by using wired connections to the implant, but attaching wires to the head has been shown to elevate the risk of infection and injury. We consider safety from the ground up when architecting HALO.

HALO's capabilities range from neuronal signal extraction to seizure onset detection (for epilepsy patients) and movement intention (for patients suffering from paralysis or Parkinson's disease). The capabilities are realized using hardware processing elements (PEs) that form the blueprint for our architecture. We share and configure PEs using a low-power network (with a handful of programmable switches) into distinct processing pipelines in a fluid, extensible, and modular manner. HALO is configurable, judicious in its use of power, safe, and can naturally integrate other/more PEs. We round HALO out with a low-power RISC-V micro-controller that configures PEs into processing pipelines, and also supports computation for which there are currently no dedicated PEs.

We are currently taping out a first generation HALO chip using a mix of hand-crafted (and optimized) Verilog, and hardware designed using high level synthesis (HLS) tools (for rapid prototyping). We build and evaluate our design using the electrophysiological data. We ascertain that our processing pipelines, ranging from closed-loop support for seizure and tremor mitigation, to spike detection and extracellular voltage stream compression, all fit under the power budget considered safe for implantable BCIs (i.e., 15 mW). HALO achieves 4-57× reductions in power versus software alternatives.

Background and Motivation

Implantable BCIs, a skeleton of which we show in FIG. 1, record neuronal activity with high fidelity, but must be surgically implanted on the brain tissue. This presents safety challenges. The device must not heat up the surrounding brain tissue by more than 1° C., which constrains the power budget to 15-40 mW (depending on the target brain region). The communication link on these devices is equally important. On-board radios introduce an important constraint—since RF deposition also heats up brain tissue, the FCC and FDA limit the specific absorption rate to 1.6 W/kg (over 1 g of tissue) and 1 W/kg (over 10 g of tissue), respectively.

These strict device power and RF power transmission constraints have led to a fragmented ecosystem of BCI designs. The logic on board these devices (shown in FIG. 1) is usually tailored for specific uses (e.g., seizure detection versus data recording, etc.), and for specific brain regions. There is an increasing need for a single general-purpose processing platform for implantable BCIs that can be used in a principled and extensible manner for a broad range of uses. HALO is our realization of this platform, and must meet two goals to be widely usable: first, all the processing capabilities that we support must use less than 15 mW of device power, and second, we must reduce RF transmission bandwidth as much as possible to mitigate power deposited in brain tissue. The challenge is that HALO must achieve these goals while also being sufficiently general-purpose to support heterogeneity in the following categories.

Sensors: BCIs use sensors ranging from single electrodes for individual neurons (i.e., single unit recordings) to arrays of hundreds of microelectrodes, each of which records from (and potentially electrically stimulates) of 5-10 neurons and therefore records/stimulates several hundred neurons in total. Going forward, sensors will record from an ever-increasing number of biological neurons; for example, widely-used Utah arrays already integrate up to 256 microelectrode channels. Although forward-looking and not immediately practical, approaches like Neuralink's "threads" and DARPA NESD performers are targeting thousands to millions of channels. Principled architectural approaches are needed to make it viable to design real-time processing for such vast amounts of data.

ADCs: The analog data recorded from the sensors must be amplified and digitized via analog-to-digital converters (ADCs). BCIs use ADCs with differing sample resolution and frequency, but 8-16 bits per sample at 20-50 KHz are common. HALO is equally applicable to other ADC technologies.

Communication: BCIs use RF links that vary from the low MHz to GHz range. Recent implantable BCIs have used 2.4 GHz radios to manage the large amounts of data that must be exfiltrated. As much as possible, designs should aim to minimize radio transmission power.

Power sources: BCIs are powered by single-use non-rechargeable batteries, rechargeable batteries, or inductive power transfer. All must be judicious with power. Non-rechargeable batteries require service lifetimes of 12-15 years, as they require surgery for replacement. Rechargeable batteries require transcutaneous wireless charging, which must not excessively heat surrounding tissue and interfere with other devices, and have only a limited number of charge-recharge cycles before they are unusable. Inductively-powered approaches use wireless charging, and must also reduce the transferred power so as to prevent excessive heating. HALO is compatible with any of these approaches.

The HALO Architecture for BCIs

FIG. 2 presents HALO's architecture. Previous BCIs generally support only specific classes of capabilities because it is challenging to realize their logic within the tight power budgets necessary for safe operation. HALO overcomes this problem by decomposing capabilities into computational kernels, pruning them, and identifying which ones are common among capabilities. The resulting kernels, which HALO implements as PEs, can be assembled into processing pipelines by an integrated low-power RISC-V micro-controller via a programmable network fabric. Careful PE implementation ensures that all processing pipelines operate under 15 mW power budgets. The on-board micro-controller can support other workloads for which there are (currently) no PEs.

Frequently-Used Capabilities

FIG. 2 shows that HALO assembles PEs into processing pipelines that realize five capabilities representative of real-world BCI uses. Some require closed-loop operation (with real-time processing), and others (e.g., compression) reduce radio transmission bandwidth. The following capabilities are implemented in HALO:

Seizure prediction: Implantable BCIs are already being used to treat epilepsy patients. These BCIs predict seizure onset from neuronal firing patterns, and, in the case of a predicted seizure, electrically stimulate neurons to break feedback loops in the responsible neural circuits, mitigating the seizure. HALO supports this pipeline with PEs for Fourier transforms (FFT), cross-correlation (XCOR) for the microelectrode array channels, and digital band-pass filtering via a Butterworth Bandpass Filter (BBF). All three feed into a support vector machine (SVM) PE, which uses these data streams along with a threshold (THR) PE to identify seizure onset. We use FFT, BBF, and XCOR as features to the SVM because they are complementary; i.e., each one can identify seizure onset patterns that the others sometimes miss.

SVM output is routed to the RISC-V micro-controller, which prompts the microelectrode array to stimulate the neurons to mitigate (and ideally eliminate) the seizure. Both the raw neuronal data and the seizure event can be sent over the radio to external monitoring systems. One of the reasons this data is exfiltrated is to permit off-board computation (performed by doctors and technicians) to identify how to configure the threshold value for THR. Finally, HALO supports optional encryption of the exfiltrated data via an AES PE.

Because effective seizure mitigation provides stimulation of the brain within a few milliseconds of seizure onset detection, this pipeline requires real-time processing. It is therefore an example of other closed-loop BCI capabilities that also require real-time responsiveness to treat major depressive disorder, psychosis, and obsessive-compulsive disorder.

Movement intent: Motor cortex signals can be used to identify how the brain plans to move limbs. For individuals with movement disorders (e.g., essential tremor, Parkinson's), therapeutic stimulation of the motor cortex (when the affected limb is in use) can relieve symptoms. Implantable BCIs can achieve this by continually stimulating the brain region, but this is wasteful when the affected limb is unused, and can lead to medical side effects. A better option—and HALO's approach—is to record and process neuronal signals and then stimulate the neurons after identifying when it is appropriate to do so. Similarly, for paralyzed individuals, decoding neuronal information can be used to control prostheses. Such approaches have been demonstrated on non-human primates, and require millisecond latency processing between the detection of movement and stimulation of the brain. The key insight that drives these processing algorithms is that movement intent is correlated with drops in neuronal firing in the 14-25 Hz frequency band. These drops can be detected using FFT. Post-detection, the RISC-V micro-controller prompts the microelectrode array to stimulate the brain tissue. The raw data can be exfiltrated via the AES PE and radio.

Compression: Compression is valuable in reducing radio transmission, especially as the number of sensor channels (and hence recorded neuronal data) increases. There has already been much work on how to best compress neuronal data. One may consider lossy compression as a first line of attack; unfortunately, the brain is not understood well enough at this point to identify, in a principled manner, what portions of the electrophysiological data can be safely discarded. The consensus is that apart from some specific and well-understood forms of lossy compression (e.g., spike detection, which can be implemented in HALO), lossless compression is safer and more widely usable.

We implement lossless compression on HALO in two ways. The first, Compression (LZ4), implements the LZ4 algorithm and pipes data through the LZ and linear integer coding (LIC) PEs. The second, Compression (LZMA), implements the LZMA algorithm and pipes data through the LZ, MA, and range coding (RC) PEs. Both pipelines are fed through the AES PE and radio. We implement multiple compression algorithms for two reasons. First, depending on the brain region and activity of the patient, the effectiveness of the compression schemes can vary (by as much as a factor of 40% in our experiments). Second, different algorithms use different amounts of power on the device and change the transmission requirements of the radio. We advocate using LZ4 when lowering HALO device power is the priority, and using LZMA when more power can be used (while still remaining within 15 mW) to compress data more aggressively, reducing the energy deposited by the radio into the brain tissue.

Spike detection: This is the first step in spike-sorting pipelines that identify and extract spiking activity of specific units (neurons or parts of neurons) from the recorded signal. While spike-sorting is computationally-intensive and generally performed on an external system, we include the spike-detection step on the BCI as it sends only the parts of the signal that contain a detected spike, thereby greatly reducing radio bandwidth required for data transmission. Due to the relative rarity of spikes, spike detection lowers signal transmission bandwidth by order(s) of magnitude, reducing both device power and power delivered to the brain tissue. Spike detection is implemented using the near energy operator (NEO), through the THR PE, and finally through the radio.

Encryption: We can optionally encrypt all data that is transmitted by the BCI. HIPAA recommends using AES with an encryption key of at least 128 bits, while NIST and the NSA require AES-128 for encryption. HALO therefore implements an AES-128 PE that can optionally be configured into any of the signal processing pipelines.

HALO provides these five capabilities via dynamic configuration of the PEs shown in FIG. 2 into programmable pipelines that are highly power-efficient. Further, it can provide additional capabilities beyond these five via the programmable RISC-V micro-controller.

Processing Elements

We describe the functionality of each of the PEs and its key data structures. For more details, we point readers to prior work on the original signal processing algorithms, but focus here on their hardware implementation. Building a low-power PE requires careful design of its core logic (which implements the computation kernel), local memory (that acts as a scratchpad for data for intermediate computation), and input/output adapter (that transforms the data streams from the interconnect into formats amenable to the logic). Each PE must be tunable to support data streams from multiple brain regions and to personalize care to the patient. While the RISC-V micro-controller provides one axis of configurability by assembling the PEs into pipelines, the PE logic supports another axis of configurability by permitting parameterization of aspects of the computational kernels (see Table 1). We now discuss architectural principles that we use across PEs to fit them in our power budget.

Logic: We use several architectural principles to realize the PE logic kernels. We list these principles below.

Figure 3:
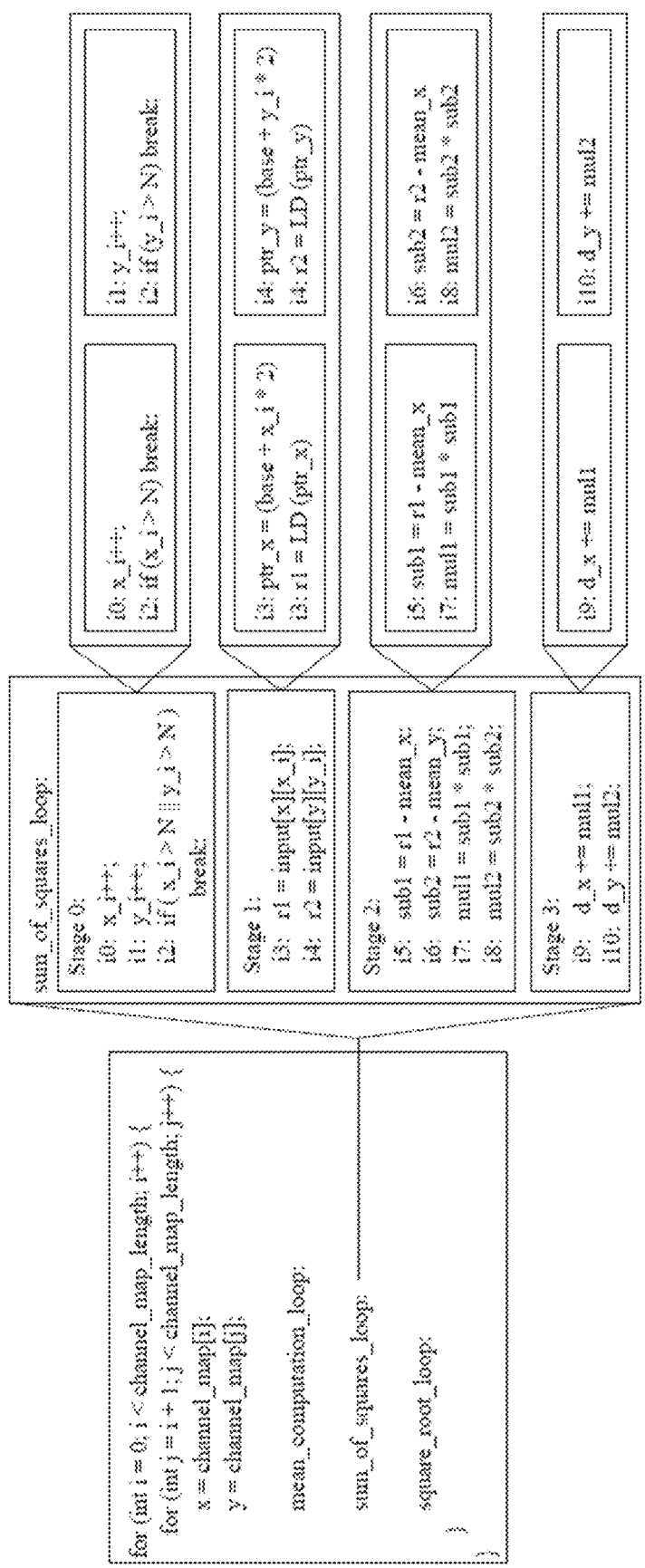
FIG. 3 depicts data computation processes of a processor according to an embodiment of the claimed invention. The left-most box shows psuedo-code for computation in the XCOR PE. The three inner level loops (mean computation, sum of squares, and square root) can each be pipelined. We expand the computation in the sum of squares loop and find that it can be separated into four pipeline stages. Within each stage, computation can be parallelized. Pipelining and parallelization save roughly 4× power versus a hardware realization of the unoptimized baseline.

Pipelining: Pipelining PEs can reduce the frequency of their logic and lower power consumption. We pipeline XCOR, NEO, BBF, and SVM. All these PEs iterate through a series of nested loops, some of which have intensive but independent computation amenable to pipelining. Consider, for example, XCOR, which calculates the cross-correlation of every pair channels measured by the sensor with the algorithm shown in FIG. 3. XCOR consists of several nested loops of computation; the three inner loops for computing the mean, sum, and square root are amenable for pipelining. To show why, we expand on the sum of squares loop to illustrate the pipeline stages. This loop can be split into four stages, each of which performs a handful of key operations. In the hardware pipeline, latches are used to buffer temporary values (e.g., $x\_i$ and $y\_i$) for use in subsequent stages. Pipelining in this manner saves roughly 1.4×PE power (commensurate with frequency decrease) compared to the baseline implementation.

Parallelization: Parallelizing computation lowers the clock frequency of a PE, thereby reducing its dynamic power. However, using more resources increases leakage power. We carefully balance these opposing trends in our PEs. Consider XCOR shown in FIG. 3. On the right, we show that the computation within each pipeline stage can be parallelized. In the first stage, the updates to the x_i and y_i variables can be performed independently, and so can the "if" condition at the end, as it is a combination of two independent Boolean checks. Parallelization approaches like this one are especially useful in the BBF PE, which requires two stages with large amounts (10s) of hardware compute sub-blocks. Parallelizing these yields significant PE power savings (i.e., 4-5×).

Rate matching: In some cases, where pipelining is not easily implementable, we use rate matching techniques. For example, the LZ PE in the LZ4 algorithm is responsible for finding matches of the current byte sequence in a structure that stores a history of the data it has received in the past. In one LZ implementation, the PE can fill the entire buffer with data and search for the longest matches for all sequences in the input buffer. In an alternate implementation, the PE can stop after matching the first sequence and wait until the receive buffer is refilled. The second approach has the advantage of gradually processing input as it is received, and avoids spikes in both power and output rates associated with rapid sprinting. We refer to this approach as a rate-matched implementation. We have implemented both approaches and find that rate matching decreases frequency by 1.4× and PE power by 1.5×.

Precision: To reduce power, we use fixed-point rather than floating-point computation. Even for our fixed-point integers, we are judicious about bit width; although signal processing algorithms can use 32-bit integers in the original studies, such high-resolution representation is often unnecessary and can be reduced to save power without significantly impacting accuracy. Knowing the limits of signal data, we replace floating-point arithmetic with fixed-point arithmetic in the BBF PE and achieve an order of magnitude reduction in power, with only (e.g., <0.1%) increase in relative error. Even when using fixed point, reducing RC's 32-bit integers to 16-bit values saved PE power by 1.6× with no change in accuracy.

Custom initialization circuits: LZ and MA PEs require initialization of data structures at the beginning of every compressed block. There are many ways to implement this initialization step, but we found that careful design of dedicated circuits is necessary for operation under power budgets. These circuits use only combinational logic; for example, for MA, we require a circuit with inverters and AND gates, one per input bit. The AND gate for the nth bit takes as inputs inverted versions of the first (n−1) bits along with bit n. In general, these circuits reduce PE power consumption by 1.8×.

Parameterization: PEs support partial parameterization to make them effective across brain regions and to personalize treatment for patients. FIG. 10 lists the key design parameters configurable at runtime by the RISC-V micro-controller. These parameters impact the power consumption and effectiveness of the target PE. Consider, for example, the seizure-detection pipeline. Many recent studies show that performing this effectively requires personalizing the signal processing to each individual's neural firing patterns. To enable this, we permit parameterization of the number of weights in SVM and their values. We expose up to 5000 weights. Naturally, the fewer weights used, the lower the computational power needed. However, using more weights improves seizure prediction accuracy. All configurations remain within the 15 mW power budget, but permit the BCI technician to configure the SVM PE to best balance these goals.

Memory: While there may be benefits to giving PEs access to a global memory via a carefully-designed cache hierarchy, HALO's initial design uses only local memories per PE. We leave more advanced memory hierarchy designs for future work. One of the benefits of local per-PE memories is that it permits the PEs to be assembled in a natural way into bigger signal processing pipelines.

An important consideration is the size of memory supported in the PEs. To conserve power and area, we calculate upper bounds on the desired memory sizes (and implement them), based partly on the dynamic range of values of the per-PE parameters in FIG. 10. Consider, for example, the LZ PE, for which the biggest determinant of memory is the process of finding matches of the current byte sequence in its history. We build in as much memory as is required for the largest history size. Naturally, the end-user may opt in some cases to reduce the history size via the RISC-V microcontroller—in these cases, the memory in unused banks can be power gated.

Adapter: We use a readily-implementable interconnect (explained in the next subsection) with a statically-determined bitwidth. Each PE uses FIFO buffers as logical adapters that transform the incoming data into the form expected by the PE. Similarly, the adapter also modifies the output created by the PE to match the fixed width interface of the interconnect. Our design has three types of interfaces: streams of bytes, bits, and tokens (packets of multiple values). FIG. 2 shows the input and output interfaces of all PEs. Naturally, the adapter interface affects the dynamic configuration of the routing and switching logic in the interconnect. The configurable routing permits construction of a custom pipeline as long as the output interface of a module and input interface of the following module match, and the module is not utilized in any other pipeline (i.e., no structural hazards are present). In practice, this gives HALO a wide configuration space and allows users to construct custom pipelines with many PE combinations.

Interconnect and Switches

We build PEs such that they operate in distinct clock domains and communicate with one another asynchronously in a self-timed manner. This improves power efficiency, as each PE can be clocked at the lowest frequency required to process its data. It also allows us to synthesize each PE using established synchronous design flows. Local (intra-PE) synchronization is based on per-PE pausable clock generators and clock control units. The clock generators are based on ring oscillators combined with a delay line which is extracted from the critical path. The ring oscillator is designed so that its frequency variation tracks the critical path.

We also realize a readily-implementable interconnect architecture built on an asynchronous communication fabric. It uses an asynchronous SEND-ACK communication protocol over an 8-bit data bus (i.e., the sender sends data over the data-bus and waits for an ACK from the receiver). The receiver sends an ACK back once it has received the input and is ready to receive new data. An interconnect wrapper provides a FIFO interface for the input and output of each PE, along with the adapters described in other sections.

We build configurable switches to assemble the interconnect so that it realizes our target pipelines. Routing is similar to FPGAs (i.e., we fix the routes in the network but allow the links to be configurable). Switches are implemented with programmable muxes/demuxes. We do not currently allow loops in the network in order to simplify communication, but intend studying this in the future.

RISC-V Capabilities

We integrate a low-power micro-controller on HALO to configure the PEs and perform any arbitrary computation not currently supported by PEs. Any low-power micro-controller is suitable for this role, and we pick RISC-V. In more detail, the RISC-V microcontroller enables the following capabilities.

Pipeline configuration: The RISC-V micro-controller assembles PEs into pipelines by configuring the programmable switches in software. We use instructions to write to GPIO pins that set the switches dynamically. Any PEs with matching input/output data interfaces can be configured into a pipeline (i.e., the output interface of a PE and the input interface of the other PE should be the same).

PE configuration: The RISC-V micro-controller configures the PE parameters from Table 1. Each PE maintains parameter variables in its internal memory. The RISC-V micro-controller has access to each PE's internal memory and writes these variables. This is, for example, how new weights can be uploaded for the SVM PE to personalize care for patients.

Closed-loop support: The RISC-V micro-controller can configure the switches in the pipeline so that it receives and operates on the result of any PE in software. This is particularly useful for closed-loop recording/stimulation scenarios. For example, on a prediction of a seizure, the RISC-V micro-controller can set the microelectrode array to stimulate the neurons to mitigate the seizure. While dedicated hardware could be built for the stimulation control logic, such events are more suitable for software execution as they occur rarely and require more complex decision-making; i.e., the length, frequency, and amplitude of the stimulating pulses, as well as the selection of stimulating channels all need to be selected to match patient therapy. In HALO, we permit stimulation of many more channels than what is permitted by current implantable BCIs. Specifically, current designs permit stimulation of only 4-8 channels, each of which requires roughly 0.03 mW. Because HALO is more power-efficient than current designs, we can support as many as 16 channels of stimulation using only 0.5 mW.

Safe operation: HALO realizes ultra-low power Vdd comparator circuits (running at low frequencies) to identify power overshoot. On overshoots, this circuit interrupts the micro-controller, instructing it to shut off PEs to lower overall power.

Naturally, the RISC-V micro-controller must be used with care, as it consumes more power than the PEs. It is, however, well suited to run low-intensity tasks and process low data rates. In HALO, we run the RISC-V micro-controller at a low frequency (30 MHz) with a small amount of memory (64 Kb). Despite requiring few compute and memory resources, such micro-controllers can perform complex communication and control services and even boot real-time OSes.

Modularity and Extensibility

HALO is modular and extensible. This is particularly important for implantable BCIs. One reason for this is that implantable BCIs are undergoing rapid innovation—as we learn more about the brain's function and its ability to interface with the digital world, the types of signal processing blocks and logic we may want to support continues to grow. An architecture that naturally permits insertion of new PEs (as their utility is discovered) is therefore valuable. Additionally, implantable BCIs require FDA approval for chronic implantation. This approval process can take several years—a modular structure makes it easier to add (or remove) processing capability from HALO if mandated by the FDA.

Methodology

We are currently in the process of taping out the first generation of HALO chips. To develop our design and assess its performance/power characteristics, we rely on a comprehensive evaluation methodology that includes synthesizing our hardware with state of the art CAD tools.

Target Design

HALO can operate with all sensor, ADC, amplifier, and radio technologies. For our evaluation, however, we focus on a platform that uses exemplars of these components widely-used in neuroscientific literature. In particular, we assume a microelectrode array with 96 channels, each of which records activity of pockets of neurons (i.e., 5-10) in their vicinity. We allow 2× more simultaneous stimulation channels (16) than current state of the art designs. This translates to a 0.48 mW upper bound for chronic stimulation, which is used in the movement intent and seizure prediction pipelines. We thus stress-test the performance and power requirements of HALO. Additionally, we assume that each sample is encoded in 16 bits at a frequency of 30 KHz, like recent work on BCIs. This results in a real-time data rate of 46 Mbps. Finally, we assume a radio with an operating energy of 200 pJ/bit, similar to current implantable BCIs. We consider a strict power budget of 15 mW from the range seen in state of the art BCIs. State of the art ADCs use 1 mW per 1 Msps sampling rate. In line with that, we dedicate 3 mW power to ADCs and amplifiers. All processing pipelines (including the radio) within HALO must therefore consume no more than 12 mW of power.

For our power evaluations, we assume that the LZ and MA PEs have 4 KB of history (we also assess how varying history length impacts power and compression ratio). We assume 256-entry byte arrays for the literals in LIC, and use 16-bit divides in RC. We assume 5000 weights for the SVM PE, and use a 1024-point FFT. Finally, we integrate a 2-stage in-order 32-bit Ibex RISC-V core (formerly known as Zeroriscy). The core is configured to work with the RV32EC ISA, specifically using an embedded (or reduced) version of RV32I. Our RV32EC uses 16 general-purpose registers, and uses the "compression" feature to reduce memory requirements for storing programs. We fully synthesize and test the RISC-V core using our commercial synthesis flow.

Hardware Evaluations

We design and test all of HALO's components using a commercial 28 nm fully-depleted silicon-on-insulator (FD-SOI) CMOS process. All synthesis and power analysis is performed using the latest generation of synthesis tools, combined with standard cell libraries from STMicroelectronics. Our memories were generated using foundry-supplied memory macros. Relying on commercial IP (instead of academic or predictive tools) means that our power numbers are more representative of real fabricated chips. We run multi-corner, physically-aware synthesis to cover all process and environ-mental variation corners. To err on the conservative side, we present results for the worst variation corner. Since our design is power-limited, we define this corner at TrFF, VddMAX, and RCBEST. We adhere to HALO's strict thermal constraints by fixing temperature at 40° C. on all our tests.

We compare HALO PEs against the power expended by running software versions of our PEs on the RISC-V micro-controller. To do this, we combine our hardware evaluation flow with a custom memory profiler that determines the run-time memory requirements of our target software. We simulate our software kernels in behavioral RTL to quantify these memory requirements along with the minimum required frequency necessary to meet the real-time performance requirements of the kernel. Subsequently, we synthesize the RISC-V core with the minimum frequency as a constraint and re-simulate the gate-level RTL to extract annotated switching activity factors for all gates. We then use the netlist and annotated activity factors to extract accurate power numbers for logic, and introduce memory activity factors into the memory compiler. Note that the same set of steps is used to measure PE power.

Finally, we also consider the power dissipated by our inter-connect and switches. To estimate an upper bound on power, we first assess area numbers for the interconnect with respect to our target technology. As reported in prior work, such interconnects require relatively few gates (e.g., 0.55 kilo-gate equivalents) and have <1% impact on power. We also use a floorplan to assess the overheads of the input/output adapters, an upper bound on routing distance, the wire capacitance of our target technology, and find that our upper bound on total interconnect and switch power is less than 300 µW.

In-Vivo Electrophysiology from Non-Human Primate

We use electrophysiological data from the brain of a non-human primate. Microelectrode arrays were implanted in two locations in the motor cortex, corresponding to the left upper and lower limbs. The arrays are connected to a CereplexW™ head stage for communication which data transmission to a Cerebus™ data acquisition system and signal processor. Multiple antennas are used to accommodate free movement of the animal. We use recordings of brain activity while the animal performs tasks such as walking on a treadmill, reaching for a treat, and overcoming a moving closed-cell foam obstacle.

Evaluation

We quantify HALO's operation by first focusing on a head-to-head comparison of HALO's processing pipelines versus their software counterparts running on low-power RISC-V micro-controllers. We also show that HALO's pipelines remain within the target power budgets necessary for the entire system to operate under 15 mW.

Power Analysis of Frequently-Used Capabilities

Figure 4:
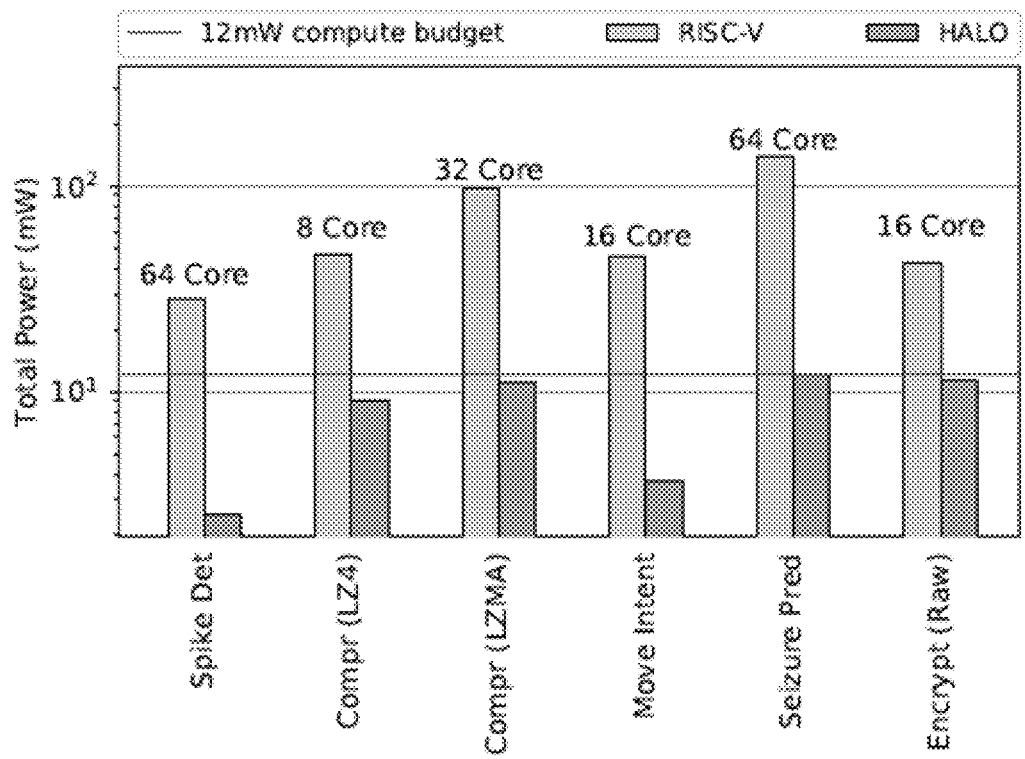
FIG. 4 depicts a graph of consumed power of the processing architecture according to an embodiment of the claimed invention. Total power, excluding ADC and amplifier power, for the processing architecture (indicates as HALO) versus RISC-V is shown. Power numbers include PEs, control logic and radios. The y-axis plots power in log-scale. To meet the 15 mW power budget permissible for the entire device, the components (without ADCs and amplifiers) need to be under 12 mW (we mark this upper bound with the horizontal line). We compare HALO against the lowest-power RISC-V configuration that meets the performance target of 46 Mpbs.

FIG. 4 quantifies the power consumed by HALO versus its software-only counterparts. We focus on the power consumed by the processing logic and radio, rather than ancillary components like the amplifier array and ADCs. The software versions of our capabilities execute on RISC-V micro-controller cores, in several configurations. The baseline case one might consider is one where one RISC-V core runs at a the target frequency necessary to process data from all 96 channels at our required real-time rate of 46 Mbps. However, it is also important to quantify the power of multi-core options, where several RISC-V micro-controllers, each running at a fraction of the single core version's target frequency, divide the 96-channel data streams and operate on them in parallel. Consequently, we perform experiments where we study 1 to 64 RISC-V core configurations, in steps of powers-of-two (i.e., 2, 4, etc.). In each case, our synthesis tool helps us determine the target frequency necessary for the single RISC-V core to achieve our real-time processing needs. At core counts of 2, 4, 8 (and so on), our target frequency is divided by 2, 4, 8 (and so on). In few cases, our real-time processing requirements mandate frequency targets that are far too high to be met by a single core RISC-V, making them un-implementable for HALO. FIG. 4 quantifies the results of the best RISC-V configuration that meets timing (with its core count annotated) and compares it against our HALO processing pipelines.

FIG. 4 shows that HALO meets all required performance targets but uses orders of magnitude lower power for all capabilities. In fact, all software versions far exceed the permissible 12 mW power budget for processing and the radio (in many cases by one or more orders of magnitude). Among the software versions, the seizure prediction pipeline requires the most power, because of the computational load of FFT, XCOR, and BBF. To meet our 46 Mbps data rates, the lowest-power software configuration uses 64 cores, each running at 288 MHz, and consumes over 100 mW of power. In contrast, HALO performs the same computation using 12 mW of power. Overall, HALO achieves a 5-47× improvement in power over the lowest-power software alternatives executing on RISC-V.

Power Analysis of Processing Elements

We now turn our attention to per-PE details in FIG. 5. For each PE, we quantify the operating frequency to process the full stream of neuronal data at 46 Mbps. We separate logic and memory power into static and dynamic components, and also show overall area. At the bottom, we show power and area breakdown for PEs that are assembled together to form the various pipelines that HALO supports. The last row shows the frequency, power and area breakdown of the RISC-V micro-controller, when running low-intensity tasks such as setting up pipelines, controlling stimulation, and providing a medical communication interface.

FIG. 5 shows that the compression and seizure prediction pipelines consume the most power, but are still within the power budget. There is a correlation between operating frequency and power; the higher the operating frequency, the higher the dynamic power. Furthermore, as expected, PEs that use more memory (e.g., LZ, XCOR, MA, etc.) also expend more dynamic and static power on the memory component.

Figure 6:
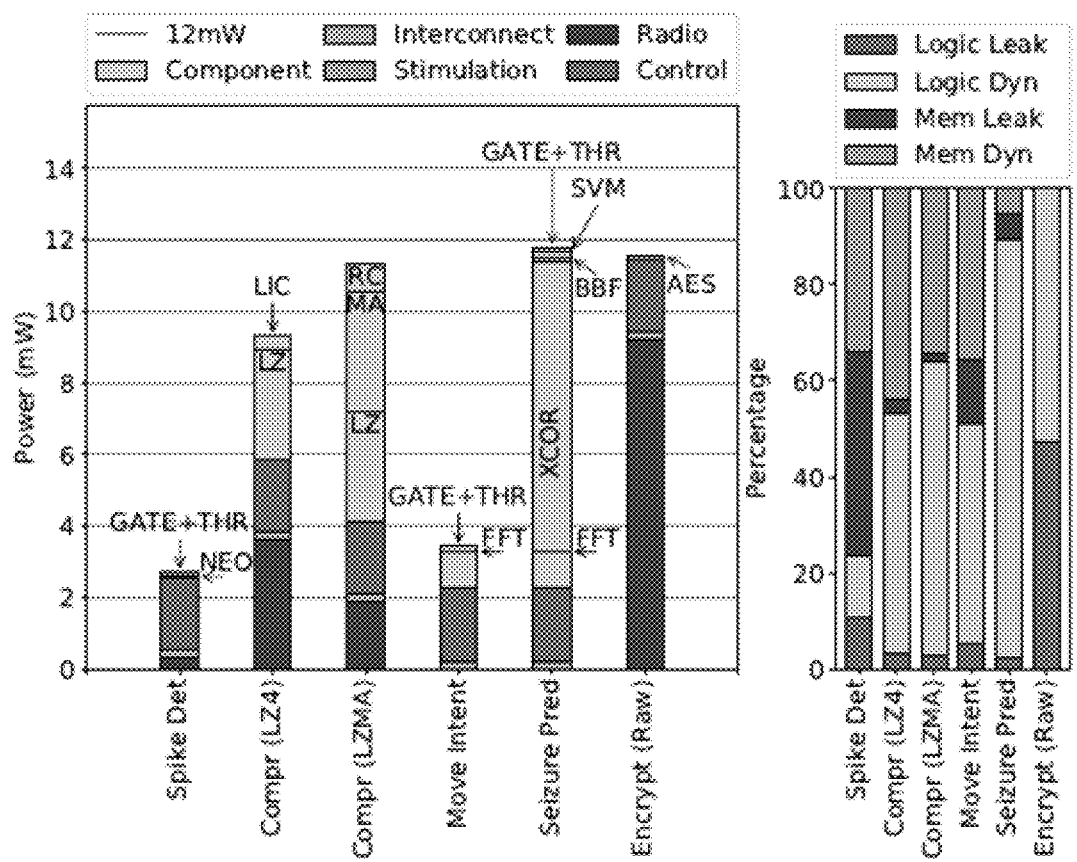
FIG. 6 depicts a graph of total power expended for various processing pipelines, according to an embodiment of the claimed invention. Total power expended by each processing pipeline (excluding amplifiers and ADCs). We breakdown overall power consumption into contributions of individual PEs, stimulation, and control. Control refers to power taken by the micro-controller to setup the pipeline. Stimulation refers to power taken to perform chronic neurostimulation. The right panel depicts percentages of total power expended on compute logic and memory, separated into dynamic and leakage components.

FIG. 6 elaborates further on how the PEs in FIG. 5 combine to affect the power of the entire processing pipeline. On the left, we show the total power expended by the processing pipeline (discounting ADCs, amplifiers, etc.), and separate the processing contributions into the various PEs, and on the RISC-V core that is used to perform tasks like microelectrode array stimulation control for movement intent and seizure prediction. All capabilities remain comfortably under the 12 mW power budget for the processing pipeline and radio. As expected, spike detection uses particularly low power because it is simple (NEO, GATE, and THR require few hardware resources), and uses low radio bandwidth. On the other hand, encrypting the raw data requires little power for AES, but more power for the radio as it has to transmit the entire raw data stream from the 96 channels. The dedicated compression schemes (i.e., LZ4 and LZMA) consume roughly 7-9 mW, with varying amounts going on logic versus the radio. LZMA has a higher compression factor and hence requires lower radio power. However, it requires more computation to achieve this compression ratio, which is why its logic power is higher. Finally, interconnect power remains negligible.

The graph on the right in FIG. 6 sheds light on the breakdown of processing pipeline power in terms of dynamic versus leakage, for the logic and memory parts of the PEs. These numbers vary substantially, with techniques that use little computation (e.g., spike detection) expending the bulk of its power on memory. Most other capabilities require a balance of power across the compute and memory.

In cases where memory accesses are more frequent (e.g., the compression algorithms), dynamic memory power outweighs leakage.

Finally, the choice of HLS-generated versus hand-crafted Verilog has a significant impact on power. FIG. 5 shows that Applicant's hand-crafted versions of FFT and AES PEs require roughly 1 mW and 0.1 mW respectively. These numbers are dramatically better than their HLS equivalents, which we also developed for comparison. For example, the HLS version of FFT consumes 70 mW. We also observe an order of magnitude difference in power for AES. HLS techniques can be used carefully—for HALO, we ensure that our PEs never exceed the maximum power budgets. As we extend HALO with even more sophisticated processing pipelines, we will continue balancing the rapid prototyping benefits of HLS tools with the power benefits of hand-optimized Verilog.

Impact of Microarchitectural Design Decisions

Figure 7:
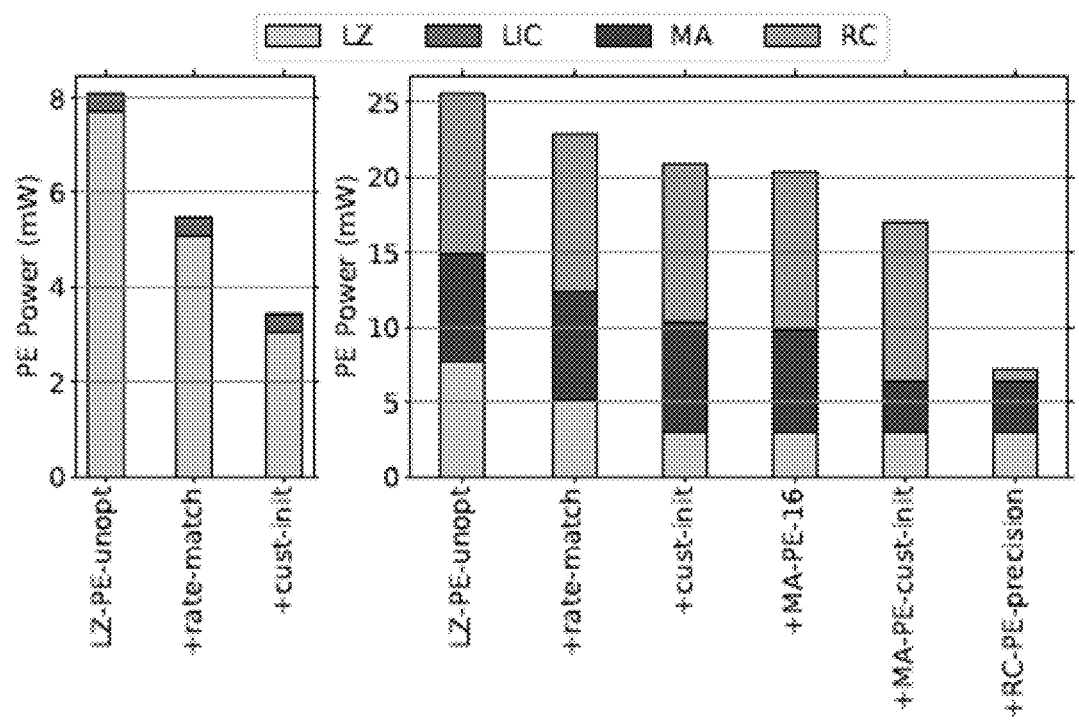
FIG. 7 depicts at left the impact of rate matching and custom initialization circuits on power used by PEs in LZ4. Optimizations are applied to the LZ PE, which consumes much more power than the LIC PE. At right is shown the impact of rate matching, custom initialization circuits, and precision improvements on LZMA PE power.

We discussed above several microarchitectural optimizations that were instrumental in realizing low-power PEs that fit under our target power budget. FIG. 7 shows the impact of our microarchitectural optimizations on the power consumed by the LZ and LIC PEs for LZ4 (on the left), and LZ, MA, and RC PEs for LZMA (on the right). Since these optimizations impact only PE power, we elide a discussion of their impact on radios, ADCs, amplifiers or the RISC-V core. Both these graphs show the processing pipeline power, and can be under the 12 mW target budget. For LZ4, even an unoptimized version uses only 8 mW, of which the LZ PE uses more power (roughly 7 mW) because every byte of neuronal data requires lookup of a hash table to identify the last known position of the byte, and a search for a match length. Rate matching reduces power by roughly a third. Building custom low-power circuits for the initialization phase further lowers power. Power is halved with these two optimizations.

FIG. 7 shows that, unlike unoptimized LZ4, unoptimized LZMA uses 25 mW and far exceeds the 12 mW power budget. We again use the power-saving LZ techniques to reduce power to roughly 21 mW. We can also reduce MA and RC power. MA's power is spent on its counter searches and increments in the Fenwick binary tree. Each MA PE input token requires four counter fetches and two increments. One way of reducing the power is to change the counters from 32 to 16 bits. This does not introduce any errors because we also reduce the block size. We also use a custom circuit for initialization that involves updates of four arrays. This reduces power to roughly 17 mW. Finally, we reduce power even more to roughly 8 mW by reducing the bit precision of RC from 32 to 16 bits. We find that this only slightly decreases compression ratio, by less than 1%, and it is therefore a valuable way to save power.

Figure 8:
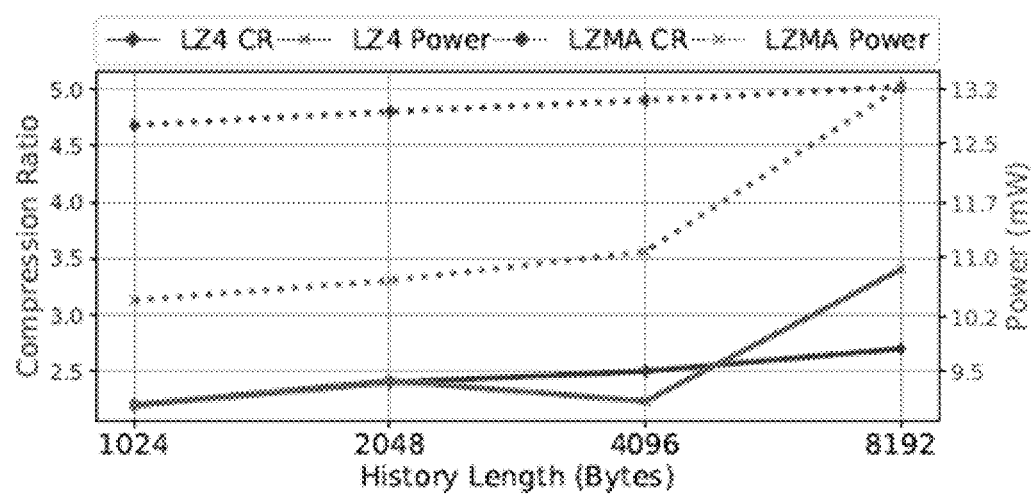
FIG. 8 depicts impact of parameterization on compression ratios and power achieved by LZ4 and LZMA. Compression ratio is shown on the left y-axis and power on the right y-axis. As history length increases, compression ratios increase, with LZMA peaking at a compression ratio of 5×. However, larger history length increases compute and memory load, increasing power consumed, with LZMA-8192 peaking at 13.4 mW. Apart from this, all configurations remain within the 12 mW processing pipeline (and 15 mW overall) power budget.

We introduced PE parameterization in previous sections. We now discuss how these parameters can affect power in FIG. 8, which plots LZ4 and LZMA compression ratios and power as a function of the history length. Longer histories enable better compression, but the gains remain modest compared with the power increases. Apart from LZMA-8192 configuration, all configurations are within the 12 mW power budget. Thus, we advocate using a 4096-byte history length.

Figure 9:
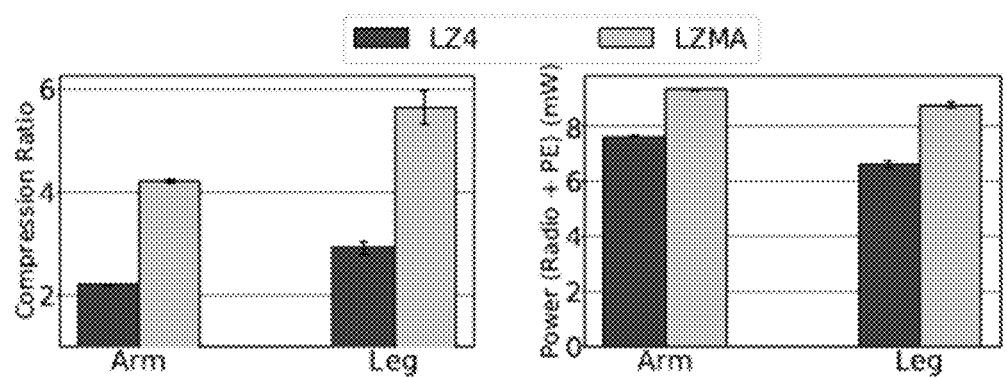
FIG. 9 depicts at left a compression ratio for LZ4 and LZMA, separated by experiments performed on the arm and leg regions of the motor cortex. The variance bars show compression ratios for different experimental trials. At right is depicted power consumed by the LZ4 and LZMA processing pipelines (excluding ADCs and amplifiers), separated by arm and leg regions too.

FIG. 9 shows an example of how HALO can adapt to the needs of different brain regions. We separate compression/power results of LZ4 and LZMA for the arm and leg regions in the motor cortex. FIG. 9 shows that LZMA's compression ratio is superior to LZ4's for both cases. Nevertheless, LZ4 power is lower, especially for the arm. If radio-deposited energy in the brain tissue is the dominating concern, we advocate using LZMA. Overall, FIG. 9 shows that the power budget targets are met regardless of target brain region.

Conclusions and Future Work

HALO presents a first step in taming the fragmented ecosystem of BCI hardware into a single general-purpose platform for wide use. We perform an initial exploration of workloads that are important for neuroscience, but the list of capabilities can be expanded. Future BCIs will implement other work-loads, with different pipelines targeting different research and medical objectives. Because of its modular design, HALO is able to support such workloads seamlessly. Looking forward, one additional capability we will investigate will be other classes of compression algorithms. For example, we have found that algorithms like bzip2 can be particularly effective in some brain regions.

We will also explore ways to further reduce the power of existing PEs. Although our current implementation meets power constraints in every single use case, investing more effort into power optimized implementations of individual PEs will allow future designs to integrate more PEs and accommodate longer, more complicated, pipelines. Complex pipelines may require dynamic routing and present a richer design space. Future designs could, for example, support a discrete wavelet transform PE that could execute repeatedly on data looped back to itself. Overall, we expect HALO to open the entire space of such design options for implantable BCIs.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A computer processing architecture comprising:
 a plurality of processing elements, each processing element configured to:
  receive a set of data from one or more input channels or from another processing element;
  execute at least one of a plurality of individualized processes on the data, distinct from processes of other processing elements of the plurality of processing elements; and
  output the processed data according to an independent clock domain of the processing element, at least some of which are distinct from other clock domains;
 a plurality of switches, wherein each switch connects a processing element to an input channel of the one or more input channels or to another processing element; and
 a micro-controller configured to:
  receive the processed data;
  control the plurality of switches by activating or deactivating each switch;
  generate a pipeline of processing elements from activating and deactivating the plurality of switches; and select one or more individualized processes of the plurality of individualized processes that each processing element within the pipeline executes;

wherein the plurality of processing elements are not general purpose central processing units (CPUs), graphics processing units (GPUs), or single instruction, multiple data (SIMD) processing units; and wherein the pipeline operates within a 15 mW power budget.

2. The computer processing architecture of claim 1, further comprising:

one or more sensors coupled to the one or more input channels and configured to collect neural signals, wherein the plurality of processing elements are each further configured to receive the set of data from at least one of the one or more sensors or from another processor.

3. The computer processing architecture of claim 1, wherein the computer processing architecture is implemented within a brain-computer interface (BCI).

4. The computer processing architecture of claim 1, further comprising:

a radio transceiver configured to transmit communications corresponding to the processed data.

5. The computer processing architecture of claim 1, wherein the micro-controller is further configured to adjust a set of parameters corresponding to the execution of the at least one individualized process for at least one processing element.

6. The computer processing architecture of claim 1, wherein each processing element comprises a dedicated local memory, wherein the dedicated local memory stores a set of instructions for executing the plurality of individualized processes, a set of parameter values corresponding to the individualized processes, and the processed data.

7. The computer processing architecture of claim 1, further comprising:

a plurality of neural stimulators, wherein the micro-controller is further configured to activate at least one of the plurality of neural stimulators according to the processed data.

8. The computer processing architecture of claim 7, wherein the micro-controller is further configured to activate 16 neural stimulators simultaneously, wherein the activation expends 0.5 mW of power.

9. The computer processing architecture of claim 1, wherein the plurality of processing elements are selected from the group consisting of a compression processor, a Fast Fourier Transform processor, a cross-correlation processor, a bandpass filter processor, a support vector machine processor, a threshold processor, a non-linear energy operator processor, a linear integer coding processor element, a gateway processor, an encryption processor, a pair-search processor, a counter value processor, and a range encoding processor.

10. The computer processing architecture of claim 1, wherein the micro-processor is further configured to:

select a pipeline design according to the processed data, wherein the pipeline design is selected from the group consisting of a seizure prediction pipeline, a movement intent pipeline, a compression pipeline, a neural activity spike detection pipeline, and an encryption pipeline, wherein the generated pipeline is generated according to the selected pipeline design.

11. The computer processing architecture of claim 1, wherein the plurality of processing elements operate on an asynchronous architecture.

12. The computer processing architecture of claim 1, wherein the one more individualized processes within the pipeline are executed by one or more computation loops.

13. The computer processing architecture of claim 1, wherein each processing element in the pipeline comprises one selected from the group consisting of: a Lempel-Ziv processor, a linear integer encoder processor, a Fenwick tree processor, a range encoder processor, a non-linear energy operator, a Fast Fourier Transform processor, a cross-correlation processor, a Butterworth bandpass filter process, a classification processor, an input threshold processor, and an AES-128 encryption processor.

14. The computer processing architecture of claim 1, wherein the pipeline is selected form the group consisting of: a seizure prediction pipeline, a movement intent pipeline, a compression pipeline, a spike detection pipeline, and an encryption pipeline.

15. The computer processing architecture of claim 1, wherein the pipeline provides a dataflow programmed to realize a particular computation.

* * * * *